United States Patent
Morel

(10) Patent No.: US 12,224,794 B2
(45) Date of Patent: *Feb. 11, 2025

(54) OPTICAL TIME-DOMAIN REFLECTOMETER (OTDR) EVENT DETECTION AND LIGHT POWER LEVEL MEASUREMENT-BASED FIBER OPTIC LINK CERTIFICATION

(71) Applicant: VIAVI SOLUTIONS INC., Chandler, AZ (US)

(72) Inventor: Benoit Morel, Lyons (FR)

(73) Assignee: VIAVI SOLUTIONS INC., Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/476,617

(22) Filed: Sep. 28, 2023

(65) Prior Publication Data
US 2024/0022323 A1    Jan. 18, 2024

Related U.S. Application Data

(63) Continuation of application No. 17/520,375, filed on Nov. 5, 2021, now Pat. No. 11,838,049.

(30) Foreign Application Priority Data

Nov. 5, 2020    (EP) .................................... 20306336

(51) Int. Cl.
*H04B 10/071*    (2013.01)
*H04B 10/079*    (2013.01)
*H04B 10/27*    (2013.01)

(52) U.S. Cl.
CPC ..... *H04B 10/071* (2013.01); *H04B 10/07955* (2013.01); *H04B 10/27* (2013.01)

(58) Field of Classification Search
CPC .................................................. H04B 10/071
See application file for complete search history.

(56) References Cited

U.S. PATENT DOCUMENTS

| | | | |
|---|---|---|---|
| 11,838,049 B2* | 12/2023 | Morel | H04B 10/27 |
| 2011/0110662 A1* | 5/2011 | Wellbrock | H04Q 11/0067 |
| | | | 398/45 |
| 2011/0141457 A1* | 6/2011 | Levin | G01M 11/3127 |
| | | | 356/73.1 |
| 2012/0163800 A1 | 6/2012 | Urban | |
| 2015/0062564 A1* | 3/2015 | Kowalczyk | G01M 11/088 |
| | | | 356/73.1 |
| 2020/0072703 A1* | 3/2020 | Roux | G01M 11/3145 |

FOREIGN PATENT DOCUMENTS

| | | |
|---|---|---|
| WO | 2009137823 A1 | 11/2009 |
| WO | 2011007298 A1 | 1/2011 |
| WO | 2013002692 A1 | 1/2013 |
| WO | 2013028108 A1 | 2/2013 |

* cited by examiner

*Primary Examiner* — Nathan M Cors
(74) *Attorney, Agent, or Firm* — Mannava & Kang, P.C.

(57) ABSTRACT

In some examples, OTDR event detection and light power level measurement-based fiber optic link certification may include performing, at one end of a device under test (DUT) of a network, a light power level measurement. An OTDR measurement may be performed at the one end of the DUT to detect at least one event associated with the DUT. Based on analysis of the light power level measurement and the OTDR measurement, an event classification may be generated to classify the at least one event associated with the DUT.

16 Claims, 9 Drawing Sheets

800

PERFORM, AT ONE END OF A DEVICE UNDER TEST (DUT) OF A NETWORK, A LIGHT POWER LEVEL MEASUREMENT BY DETERMINING, BY THE AT LEAST ONE HARDWARE PROCESSOR, BASED ON AN ANALYSIS OF THE LIGHT POWER LEVEL MEASUREMENT, WHETHER A LIGHT POWER LEVEL ASSOCIATED WITH THE DUT IS BELOW A SPECIFIED LIGHT POWER LEVEL, AND GENERATING, BY THE AT LEAST ONE HARDWARE PROCESSOR, BASED ON A DETERMINATION THAT THE LIGHT POWER LEVEL ASSOCIATED WITH THE DUT IS BELOW THE SPECIFIED LIGHT POWER LEVEL, AN INDICATION THAT THERE IS NO LIGHT ON A PASSIVE OPTICAL NETWORK (PON) WAVELENGTH
802

PERFORM, AT THE ONE END OF THE DUT, AN OTDR MEASUREMENT TO DETECT AT LEAST ONE EVENT ASSOCIATED WITH THE DUT
804

GENERATE, BASED ON ANALYSIS OF THE LIGHT POWER LEVEL MEASUREMENT AND THE OTDR MEASUREMENT, AN EVENT CLASSIFICATION TO CLASSIFY THE AT LEAST ONE EVENT ASSOCIATED WITH THE DUT
806

*FIG. 8*

OPTICAL TIME-DOMAIN REFLECTOMETER (OTDR) EVENT DETECTION AND LIGHT POWER LEVEL MEASUREMENT-BASED FIBER OPTIC LINK CERTIFICATION

PRIORITY

The present application is a Continuation under 35 U.S.C. § 120 of co-pending U.S. patent application Ser. No. 17/520,375, filed Nov. 5, 2021, which claims priority under 35 U.S.C. 119(a)-(d) to European Patent Application No. 20306336.7, having a filing date of Nov. 5, 2020, the disclosures of which are hereby incorporated by reference in their entireties.

BACKGROUND

A fiber optic cable may include one or more optical fibers that may be used to transmit light from a source to a destination. The optical fibers of the fiber optic cable may be referred to as fiber optic links. Fiber optic cables may represent a network element of a fiber optic network. In this regard, other types of network elements may include optical connectors, optical splices, optical couplers, splitters, and optical switches. In some cases, a fiber optic link may need to be certified by accurately characterizing events along the fiber optic link.

BRIEF DESCRIPTION OF DRAWINGS

Features of the present disclosure are illustrated by way of example and not limited in the following figure(s), in which like numerals indicate like elements, in which:

FIG. 8 illustrates a flowchart of an example method for OTDR event detection and light power level measurement-based fiber optic link certification in accordance with an example of the present disclosure.

DETAILED DESCRIPTION

Figure 1:
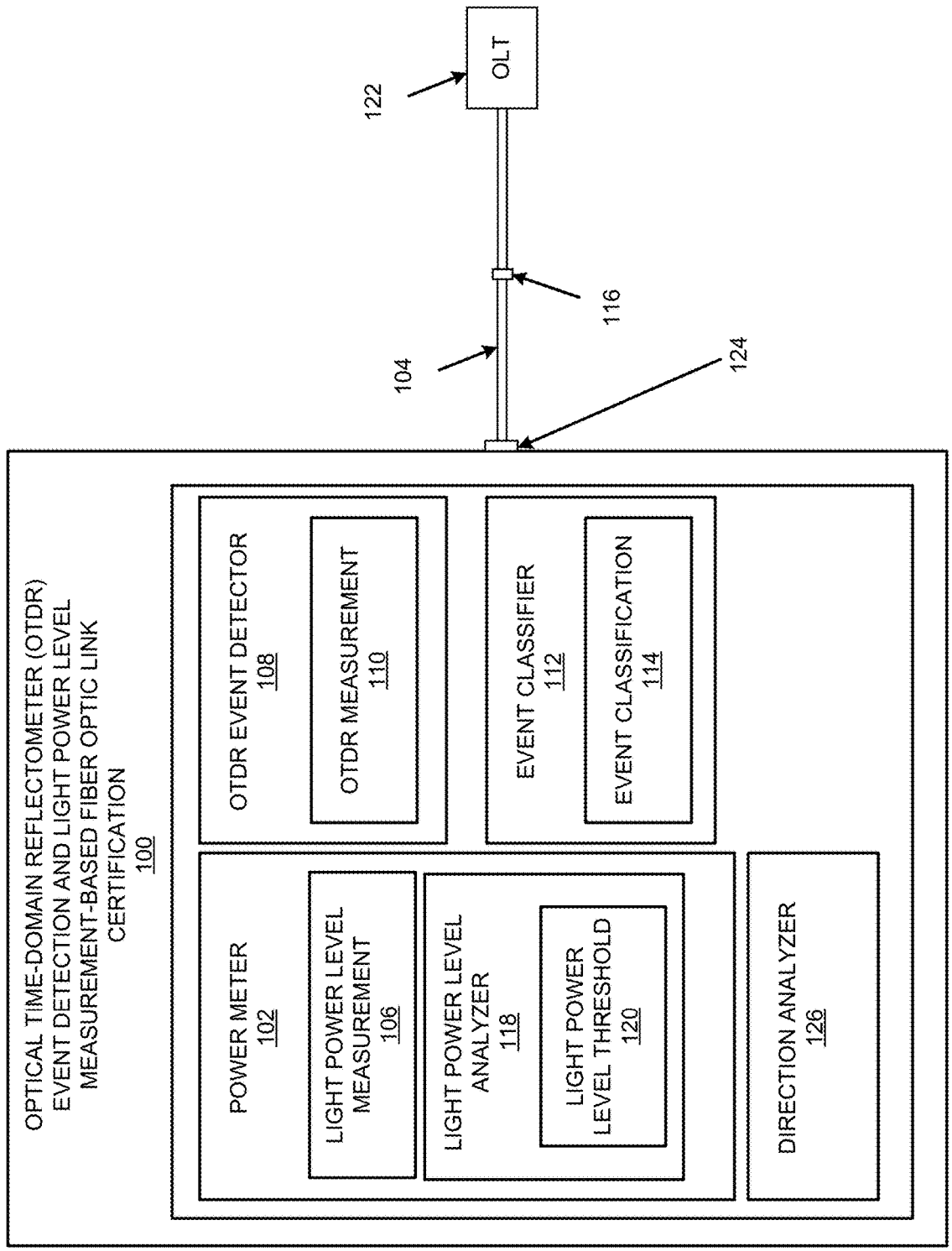
FIG. 1 illustrates an architectural layout of an optical time-domain reflectometer (OTDR) event detection and light power level measurement-based fiber optic link certification apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

OTDR event detection and light power level measurement-based fiber optic link certification apparatuses, methods for OTDR event detection and light power level measurement-based fiber optic link certification, and non-transitory computer readable media for OTDR event detection and light power level measurement-based fiber optic link certification are disclosed herein. The apparatuses, methods, and non-transitory computer readable media disclosed herein may utilize, in combination, a light power level measurement by a power meter and an OTDR measurement by an OTDR event detector to identify an event type for a device under test (DUT) of a network, such as a passive optical network (PON) network. For example, the DUT may include a section of the PON network between an optical network terminal (ONT) and a splitter. In this regard, the power meter and the OTDR event detector may be implemented in a device that may be designated as an "Optimeter".

With respect to the apparatuses, methods, and non-transitory computer readable media disclosed herein, an OTDR may utilize Rayleigh backscattering and Fresnel reflection signals to monitor events with respect to a fiber optic network. One of the unique advantages of OTDR testing is that it utilizes access to one end of a fiber optic cable that may include a plurality of fiber optic links. Since distance and attenuation measurements are based on Rayleigh optical backscattering and the Fresnel reflection principle, returned light may be analyzed directly from the one end of a fiber optic link of the fiber optic cable.

With respect to fiber optic link characterization in a network, such as a passive optical network (PON) network, a DUT that may include a section of the PON network between an ONT and a splitter may need to be certified. In this regard, the PON network may include one or more splitters, and the certification may need to be performed between the ONT and a splitter that is closest to the ONT. The certification may include proper classification of all events associated with the DUT. For example, for a PON network, a DUT may include an event, such as a splitter disposed between an optical line terminal (OLT) and an optical network terminal (ONT). In this regard, it is technically challenging to accurately classify events, such as a splitter, since an OTDR measurement may identify the event as an end of fiber event instead of as a splitter.

In order to address the aforementioned technical challenges, the apparatuses, methods, and non-transitory computer readable media disclosed herein provide for accurate classification of events, such as a splitter, for a DUT for a network, such a PON network, by utilizing light power level measurement in combination with an OTDR measurement. In this regard, based on the utilization of the combined light power level measurement and the OTDR measurement (e.g., OTDR event detection) to classify an event, such as a splitter, an OLT may be disposed after the splitter. The measurement of G-PON wavelength (e.g., 1490 nm) or XGS-PON (or 10G-PON) wavelength (e.g., 1577 nm) light level may be utilized to confirm that an OLT is present beyond an end of the DUT. Yet further, utilization of the light power level measurement may provide for a determination of whether the total loss for the associated fiber optic network is within acceptable bounds.

According to examples disclosed herein, the apparatuses, methods, and non-transitory computer readable media disclosed herein provide for utilization of light power level measurement to enhance OTDR event type detection. In this regard, further analysis may be performed by utilizing multi pulses (e.g., short pulses, and then relatively long pulses as disclosed herein).

According to examples disclosed herein, the apparatuses, methods, and non-transitory computer readable media disclosed herein provide for analysis of combining of an OTDR event detection and light power level measurement to enhance event type, using an optical reflectometer such as an OTDR without disconnecting a fiber optic cable (or a fiber optic link of the fiber optic cable).

For the apparatus, methods, and non-transitory computer readable media disclosed herein, the elements of the apparatus, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates an architectural layout of a OTDR event detection and light power level measurement-based fiber optic link certification apparatus (hereinafter also referred to as "apparatus 100") in accordance with an example of the present disclosure.

As disclosed herein, the apparatus 100 may be designated an "Optimeter", and may include a power meter and an optical reflectometer such as an OTDR.

Referring to FIG. 1, the apparatus 100 may include a power meter 102 that is executed by at least one hardware processor (e.g., the hardware processor 702 of FIG. 7, and/or the hardware processor 904 of FIG. 9), to perform, at one end of a device under test (DUT) 104 of a network, a light power level measurement 106.

An optical time-domain reflectometer (OTDR) event detector 108 that is executed by at least one hardware processor (e.g., the hardware processor 702 of FIG. 7, and/or the hardware processor 904 of FIG. 9) may perform, at the one end of the DUT 104, an OTDR measurement 110 to detect at least one event associated with the DUT 104.

An event classifier 112 that is executed by at least one hardware processor (e.g., the hardware processor 702 of FIG. 7, and/or the hardware processor 904 of FIG. 9) may generate, based on analysis of the light power level measurement 106 and the OTDR measurement 110, an event classification 114 to classify the at least one event associated with the DUT 104. In this regard, the at least one event may include events such as optical events, loss incurred, reflectance incurred, a splitter, and other such events, to thus fully certify/qualify the DUT 104 that includes the fiber network section from an ONT to a splitter as disclosed herein.

According to examples disclosed herein, the event classifier 112 may generate, based on analysis of the light power level measurement 106 and the OTDR measurement 110, the event classification 114 to classify, as a splitter 116 disposed at a second opposite end of the DUT 104, the at least one event previously identified by the OTDR measurement 110 as an end of DUT.

According to examples disclosed herein, the DUT 104 may include a section of a PON network between an optical network terminal (ONT) and a splitter 116.

According to examples disclosed herein, the power meter 102 may further include a light power level analyzer 118 that is executed by at least one hardware processor (e.g., the hardware processor 702 of FIG. 7, and/or the hardware processor 904 of FIG. 9) to determine, based on an analysis of the light power level measurement 106, whether a light power level associated with the DUT 104 is below a specified light power level (e.g., −35 dBm, or another value that may represent a low power level (LPL) based on sensitivity of associated hardware, photodiodes, acquisition chain instrument sensitivity, etc.). Further, the light power level analyzer 118 may generate, based on a determination that the light power level associated with the DUT 104 is below the specified light power level, an indication that there is no light on a passive optical network (PON) wavelength. In this regard, according to examples disclosed herein, the event classifier 112 may generate, based on analysis of the light power level measurement 106 and the OTDR measurement 110, the event classification 114 to classify the at least one event associated with the DUT 104 by generating, based on the light power level measurement 106 and the OTDR measurement 110 at a relatively short pulse width (e.g., 10 ns) and at a relatively long pulse width (e.g., 1 microsecond), the event classification 114 to classify the at least one event associated with the DUT 104 as an end of DUT. In this regard, according to examples disclosed herein, an actual end of the DUT 104 may be disposed at a distance from the splitter 116, where the distance is less than the relatively short pulse width when testing from the end of the DUT determined by the OTDR measurement 110. In other words, the short pulse width may be sufficient to certify from the ONT to the splitter, but is unable to "pass" the splitter loss and hence cannot detect the splitter, while the long pulse width can pass the splitter. Alternatively, the event classifier 112 may generate, based on analysis of the light power level measurement 106 and the OTDR measurement 110, the event classification 114 to classify the at least one event associated with the DUT 104 by generating, based on the light power level measurement 106 and the OTDR measurement 110 at a relatively short pulse width (e.g., 10 ns)

and at a relatively long pulse width (e.g., 1 microsecond), the event classification 114 to classify the at least one event associated with the DUT 104 as an inactive optical line terminal (OLT) 122. In this regard, according to examples disclosed herein, an actual end of the DUT 104 may be disposed at a distance from the splitter 116, where the distance is greater than the relatively short pulse width when testing from the end of the DUT determined by the OTDR measurement 110.

According to examples disclosed herein, the light power level analyzer 118 may determine, based on an analysis of the light power level measurement 106, whether a light power level associated with the DUT 104 is below a light power level threshold 120 (e.g., −27 dBm, or another value based on sensitivity of receptors for a PON network) and above a specified light power level (e.g., −35 dBm). The light power level analyzer 118 may generate, based on a determination that the light power level associated with the DUT 104 is below the light power level threshold 120 and above the specified light power level, an indication of a low passive optical network (PON) signal. In this regard, according to examples disclosed herein, the event classifier 112 may generate, based on the light power level measurement 106 and the OTDR measurement 110 at a relatively short pulse width (e.g., 10 ns), the event classification 114 to classify the at least one event associated with the DUT 104 as a splitter.

According to examples disclosed herein, the light power level analyzer 118 may determine, based on an analysis of the light power level measurement 106, whether a light power level associated with the DUT 104 is above a light power level threshold 120 (e.g., −27 dBm for a G-PON network). In this regard, the light power level analyzer 118 may generate, based on a determination that the light power level associated with the DUT 104 is above the light power level threshold 120, an indication of a high passive optical network (PON) signal.

Operation of the apparatus 100 is described in further detail with reference to FIGS. 1-6.

Figure 2:
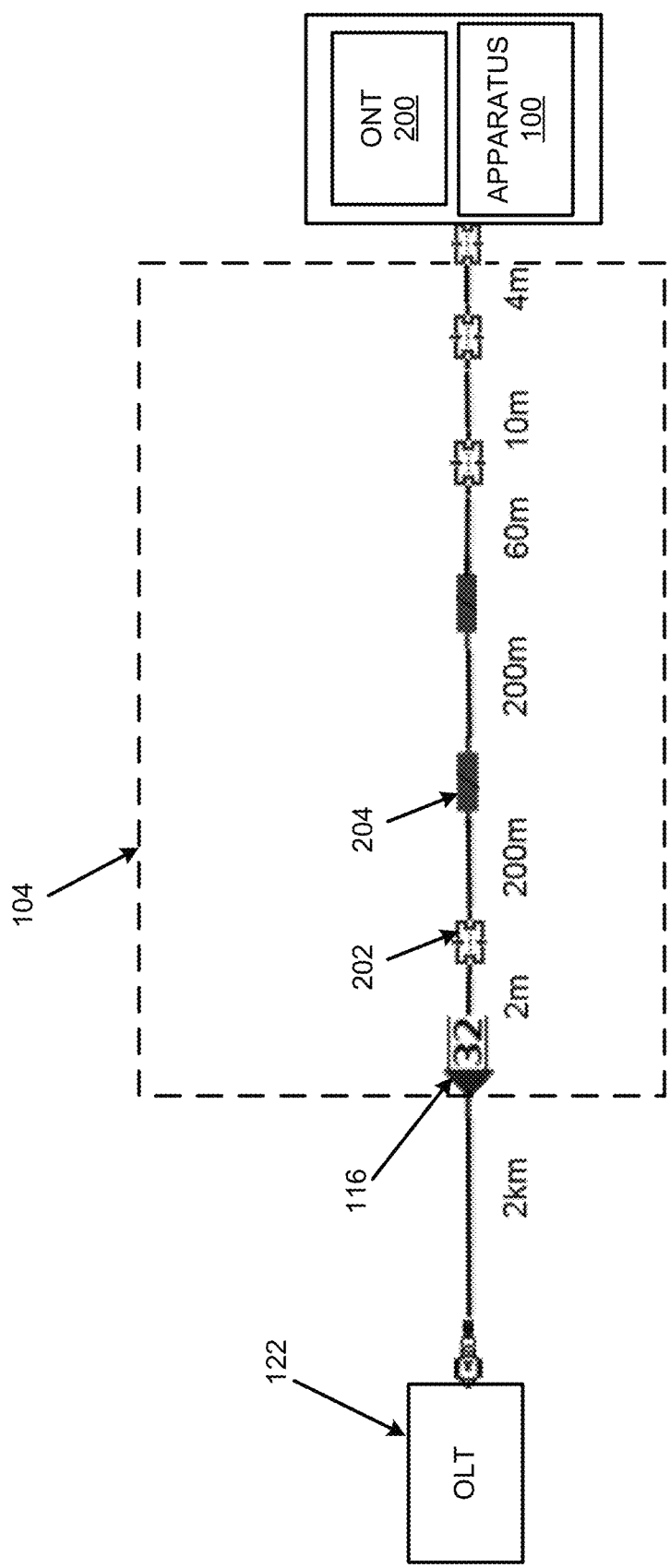
FIG. 2 illustrates a fiber-to-the-home (FTTH) PON fiber network between an OLT and an ONT to illustrate operation of the OTDR event detection and light power level measurement-based fiber optic link certification apparatus of FIG. 1, in accordance with an example of the present disclosure.

FIG. 2 illustrates a FTTH PON fiber network between an OLT and an ONT to illustrate operation of the apparatus 100, in accordance with an example of the present disclosure.

Referring to FIG. 2, the DUT 104 may include a section of a PON network between an ONT 200 and a splitter 116. In the example of FIG. 2, the splitter is specified as a 1×32 splitter, but may be any other type of splitter, and is disposed 2 km from an OLT 122. The apparatus 100 may include a power meter and an optical reflectometer such as an OTDR, and may be optically connected to the DUT 104, instead of the ONT 200. The DUT 104 may include various components, such as a splitter 116, connector 202, splice 204, etc.

When performing a certification on the DUT 104 for a network, such as a PON network, as disclosed in further detail below with reference to FIGS. 2-6, the relatively shorter light pulse width, for example, of 10 ns, may be used to fully characterize the DUT 104. However, since the relatively shorter light pulse width may not provide enough dynamic range to measure the splitter 116, which may be a last event (e.g., characterized as an end of DUT, or end of fiber optic link) on the DUT 104, light power level measurement may be utilized to classify the last event as a splitter. In this regard, the light power level measurement may be performed on a basis that the presence of light indicates that there is fiber optic link beyond what was previously considered an end of the DUT.

As disclosed herein, the apparatuses, methods, and non-transitory computer readable media disclosed herein provide for utilization of light power level measurement to enhance OTDR event type detection. In this regard, further analysis may be performed by utilizing multi-pulses (e.g., short pulse width, and then relatively long pulse width) as disclosed herein.

For example, referring to FIGS. 1 and 2, the power meter 102 may perform light power level measurement 106, for example, at 1490 nm and 1577 nm, for example on a live network utilizing the filtered power meter. The light power level measurement 106 may be performed directly on a fiber optic cable port 124 of the apparatus 100. The light power level analyzer 118 may compare the light power level measurement 106 at each wavelength 1490 nm and 1577 nm to a specified light power level (e.g., −35 dBm, which may represent a low light power level equivalent to "no" light power level) and to a light power level threshold 120 to classify the light power level measured, for example, into three categories.

A first category may include a no PON signal category for which the light power level measurement 106 is below, for example, −35 dBm (e.g., the specified light power level, or low light power level equivalent to "no" light power level as disclosed herein). For the first category, there may be no light on the PON wavelength.

A second category may include a low PON signal category for which the light power level measurement may be below the light power level threshold 120, for example, of −27 dBm, but above the "no" light power level (or no signal level). For the second category, the PON signal may be too low for adequate characterization.

A third category may include a high PON signal category for which the light power level measurement may be above the light power level threshold 120. For the third category, the PON signal may be considered adequate for characterization.

With continued reference to FIGS. 1 and 2, the OTDR event detector 108 may certify the DUT 104 (which represents the fiber network from the ONT 200 to the splitter 116), using a short pulse width. For example, the short pulse width may be approximately 10 ns. The OTDR event detector 108 may perform the OTDR measurement 110 to generate a result table as described in further detail with reference to FIGS. 4 and 5. The results table may include an indication of optical events along the DUT 104.

Figure 4:
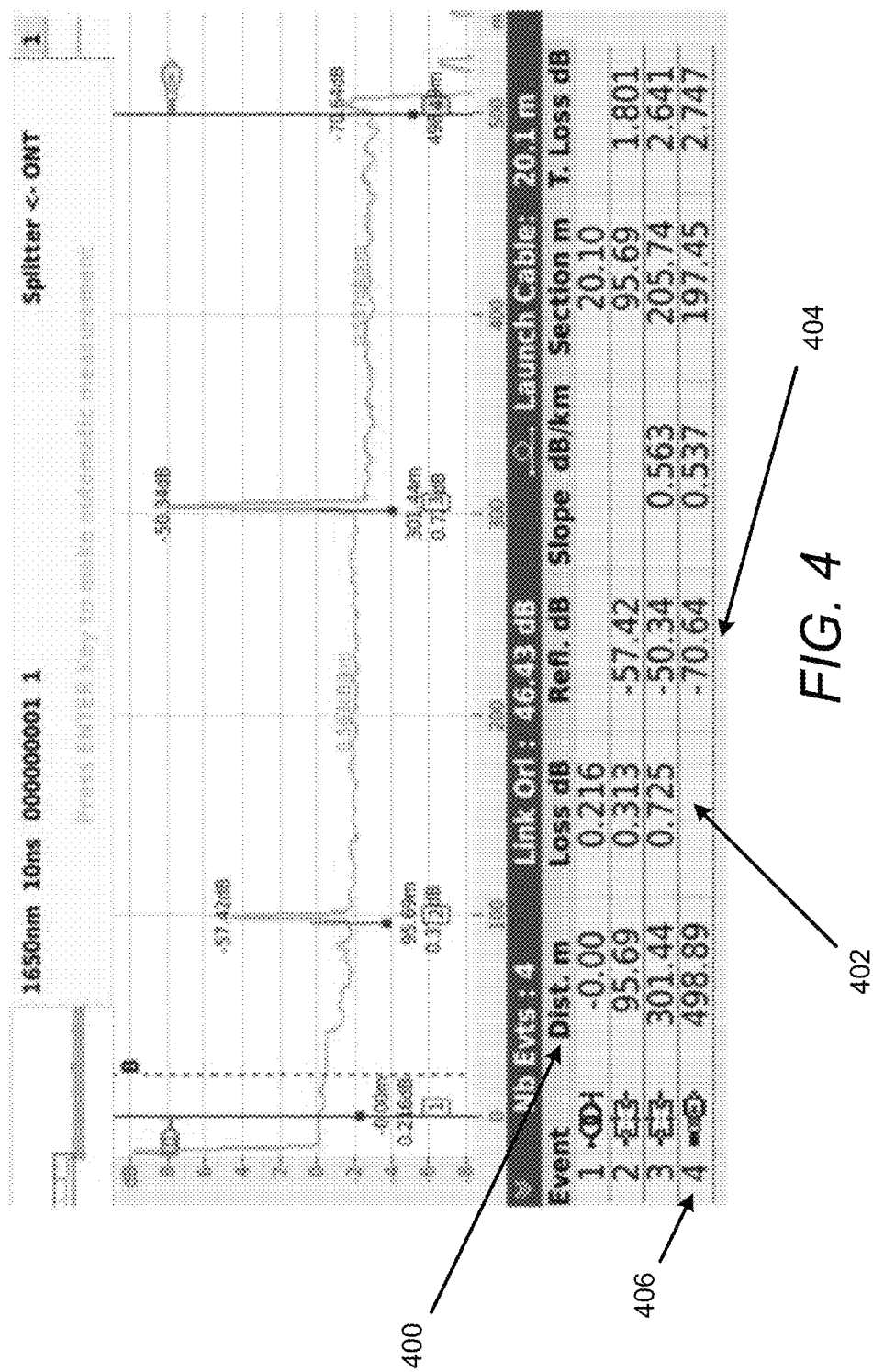
FIG. 4 illustrates an OTDR table to illustrate OTDR event detection, in accordance with an example of the present disclosure.
Figure 5:
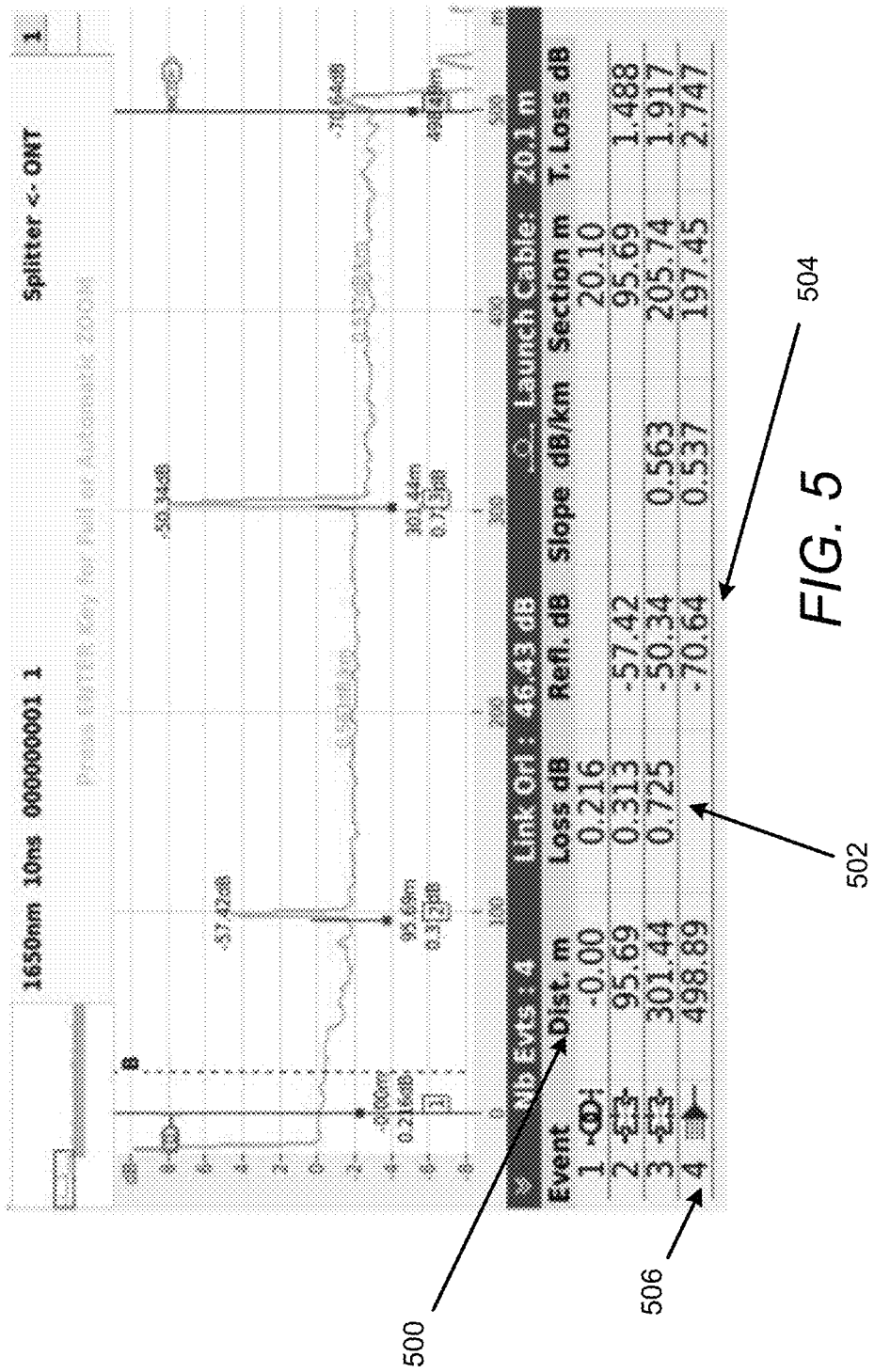
FIG. 5 illustrates another OTDR table to illustrate operation of the OTDR event detection and light power level measurement-based fiber optic link certification apparatus of FIG. 1, in accordance with an example of the present disclosure.

For example, as shown in FIGS. 4 and 5, the results include distance from the test unit (e.g., the apparatus 100) of an optical event at 400 and 500, loss incurred (in dB) at 402 and 502, and reflectance incurred (in dB) at 404 and 504. In addition to these parameters, each optical event may be assigned an event type that describes the physical reality on the fiber optic link. The last event in such a process may be referred to as an end of fiber optic link or end of DUT (e.g., event #4 at 406 and 506), where FIG. 4 displays an end of a fiber optic link and FIG. 5 shows an end of DUT.

Referring again to FIGS. 1 and 2, the power meter 102 may perform light power level measurement 106, for example, at 1490 nm and 1577 nm, and further, the OTDR event detector 108 may certify the DUT 104 (which represents the fiber network from the ONT 200 to the splitter 116), using a short pulse width. In this regard, the event classifier 112 may utilize the light power level measurement 106 to generate the event classification 114 to further classify the last event detected (e.g., at 406 of FIG. 4 and 506 of FIG. 5) at the post processing phase of the OTDR event detector 108. Thus, the event classifier 112 may utilize the light power level measurement to generate the event classification 114 to classify the last event as a splitter, instead of as an end of DUT. For example, with respect to the aforementioned first category that may include a no PON signal category for which the light power level measurement 106 is below, for example, −35 dBm (e.g., the "no" light power level), the event classifier 112 may classify an end of DUT event type as an end of DUT (or end of fiber optic link). With respect to the second category that may include a low PON signal category for which the light power level measurement may be below the light power level threshold 120, for example, of −27 dBm, but above the no signal level of −35 dBm, the event classifier 112 may classify an end of DUT event type as a splitter. Further, with respect to the third category that may include a high PON signal category for which the light power level measurement 106 may be above the light power level threshold 120, the event classifier 112 may classify an end of DUT event type as a splitter.

As disclosed herein, the apparatuses, methods, and non-transitory computer readable media disclosed herein provide for utilization of light power level measurement to enhance OTDR event type detection. In this regard, further analysis may be performed by utilizing multi-pulses (e.g., short pulse width, and then relatively long pulse width). With respect to the further analysis, in order to classify the event type from the OTDR event detector 108, the OTDR event detector 108 may add another OTDR measurement, for example, by adding a long pulse width measurement to increase an accuracy of the event classification.

In order to further enhance the classification of the event type by the OTDR event detector 108, after performing power level measurement and then OTDR event detection with a relatively short pulse (e.g., 10 ns) to detect faults on a short link (e.g., <2 km), the event classifier 112 may determine whether the event type for the end of DUT identified by the OTDR event detector 108 can be enhanced, or whether another OTDR measurement at a relatively long pulse width (e.g., 1 microsecond) may be needed to properly classify the end of the fiber optic link.

Figure 3:
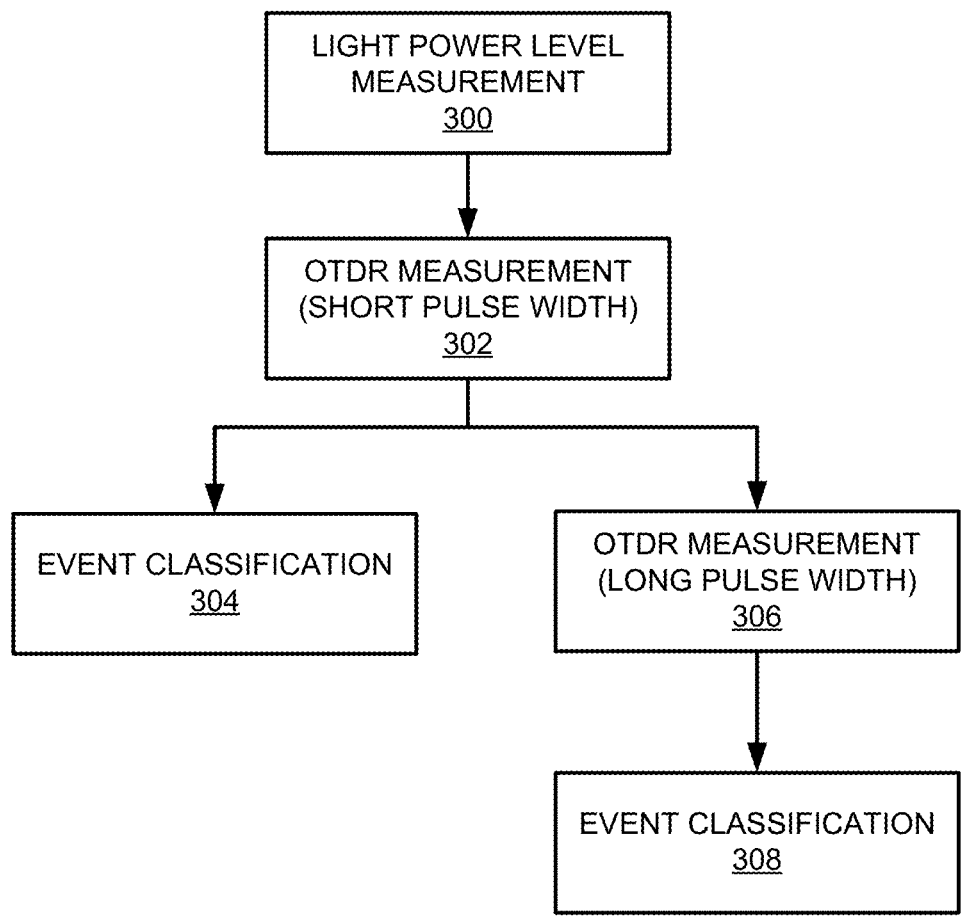
FIG. 3 illustrates a logical flow to illustrate operation of the OTDR event detection and light power level measurement-based fiber optic link certification apparatus of FIG. 1, in accordance with an example of the present disclosure.

In this regard, FIG. 3 illustrates a logical flow to illustrate operation of the OTDR event detection and light power level measurement-based fiber optic link certification apparatus of FIG. 1, in accordance with an example of the present disclosure.

Referring to FIGS. 1 and 3, with respect to a determination of whether another OTDR measurement at a relatively long pulse width (e.g., 1 microsecond) may be needed, if the power measured by the power meter 102 at block 300 results in a no signal determination (e.g., see first category above), the OTDR event detector 108 may perform the OTDR measurement 110 at a relatively short pulse width (e.g., ns) at block 302, and may further perform the OTDR measurement 110 at a relatively long pulse width (e.g., 1 microsecond) at block 306 for the event classification by the event classifier 112 at block 308. Alternatively, if the power measured by the power meter 102 at block 300 results in a PON signal that may be too low for adequate characterization (e.g., see second category above), or a PON signal that may be considered adequate for characterization (e.g., see third category above), the OTDR event detector 108 may perform the OTDR measurement 110 at a relatively short pulse width (e.g., 10 ns) at block 302 for the event classification by the event classifier 112 at block 304.

With respect to the OTDR measurement 110 at a relatively long pulse width (e.g., 1 microsecond) for block 306, the actual end of the DUT 104 may be determined to be less than the OTDR event dead zone when testing from end of DUT from block 302 (e.g., case-1), more than the OTDR event dead zone when testing from end of DUT from block 302 (e.g., case-2), or undetermined.

With continued reference to FIGS. 1-3, the aforementioned first, second, and third categories may be specified as follows.

For the actual end of the DUT 104 that may be determined to be less than the OTDR event dead zone with a short pulse when testing from end of DUT from block 302 (e.g., case-1), this case-1 may correspond to the aforementioned first category. For example, for the first category that may include a no PON signal category for which the light power level measurement 106 is below, for example, −35 dBm, the OTDR event detector 108 may perform the OTDR measurement 110 at a relatively short pulse width (e.g., 10 ns) at block 302, and may further perform the OTDR measurement 110 at a relatively long pulse width (e.g., 1 microsecond) at block 306 for the event classification by the event classifier 112 at block 308. In this regard, the event classifier 112 may utilize both the OTDR measurement 110 at a relatively short pulse width (e.g., 10 ns) at block 302, and the OTDR measurement 110 at a relatively long pulse width (e.g., 1 microsecond) at block 306 to confirm the event type at the end of the DUT 104.

For the actual end of the DUT 104 that may be determined to be more than the OTDR event dead zone with a long pulse width when testing from end of DUT from block 302 (e.g., case-2), this case-2 may also correspond to the aforementioned first category (e.g., where the end of fiber from block 306 is actually OLT 122 in the second category). For example, for the first category that may include a no PON signal category for which the light power level measurement 106 is below, for example, −35 dBm (e.g., the "no" light power level value), the OTDR event detector 108 may perform the OTDR measurement 110 at a relatively short pulse width (e.g., ns) at block 302, and may further perform the OTDR measurement 110 at a relatively long pulse width (e.g., 1 microsecond) at block 306 for the event classification by the event classifier 112 at block 308. However, in this case, the event classifier 112 may utilize both the OTDR measurement 110 at a relatively short pulse width (e.g., 10 ns) at block 302, and the OTDR measurement 110 at a relatively long pulse width (e.g., 1 microsecond) at block 306 to determine that the event type at the end of the DUT 104 is a splitter, but also indicate that the OLT 122 is inactive.

With respect to the second category that may include the power measured by the power meter 102 at block 300 that results in a PON signal that may be too low for adequate characterization, the OTDR event detector 108 may perform the OTDR measurement 110 at a relatively short pulse width (e.g., 10 ns) at block 302 for the event classification by the event classifier 112 at block 304. In this regard, the event classifier 112 may generate the event classification 114 indicating the event as a splitter. In this case, the OTDR measurement 110 at a relatively long pulse width (e.g., 1 microsecond) at block 306 may be omitted (e.g., not performed).

With respect to the third category that may include the PON signal that may be considered adequate for characterization, the OTDR event detector 108 may perform the OTDR measurement 110 at a relatively short pulse width (e.g., 10 ns) at block 302 for the event classification by the event classifier 112 at block 304. In this regard, the event classifier 112 may generate the event classification 114 indicating the event as a splitter. In this case, the OTDR measurement 110 at a relatively long pulse width (e.g., 1 microsecond) at block 306 may be omitted (e.g., not performed).

With respect to block 306 (e.g., the OTDR measurement 110 at a relatively long pulse width), the use of a long pulse may be based on the assumption that there is fiber optic link connected after the end of DUT identified at block 302, stating that the DUT 104 is indeed connected to the splitter 116, despite the absence of light measured at block 300. Alternatively, the use of a long pulse may provide for confirmation that the DUT 104 ends as determined at block 302, the DUT 104 is not connected to the splitter 116, or the splitter 116 is not connected to a feeder (e.g., fiber network from the OLT 122 to splitter 116).

Referring again to FIG. 1, according to examples disclosed herein, the apparatuses, methods, and non-transitory computer readable media disclosed herein provide for analysis of combining of an OTDR fiber link and event detection and light power level measurement to enhance DUT qualification and event type determination, using an optical reflectometer such as an OTDR without disconnecting a fiber optic cable (or a fiber optic link of the fiber optic cable).

With respect to a direction from the splitter to the ONT, in order to certify the DUT 104, a direction analyzer 126 may utilize the light power level measurement 106 to determine whether the apparatus 100 is pointed towards the correct equipment (e.g., the ONT, end user of the network and not the OLT, or service provider). In this regard, the light power level measurement 106 may be performed as disclosed at block 300 of FIG. 3 (e.g., a light power level measurement on specific PON wavelength (e.g., G-PON 1490 nm and XGS-PON 1577 nm)). If the presence of light is detected, the process may end and no other measurement is performed. Alternatively, the certification may be performed by utilizing the OTDR measurement 110.

Figure 6:
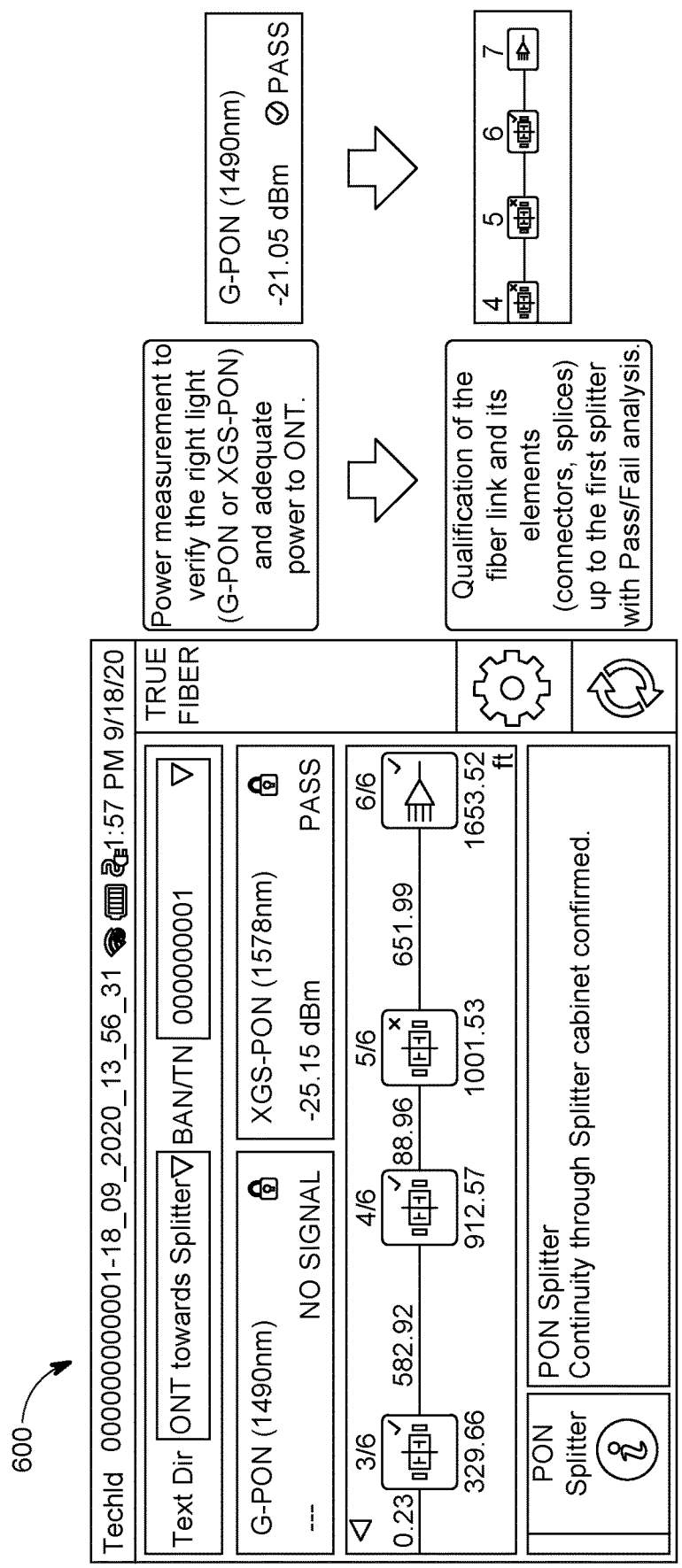
FIG. 6 illustrates a user interface display to illustrate operation of the OTDR event detection and light power level measurement-based fiber optic link certification apparatus of FIG. 1, in accordance with an example of the present disclosure.

FIG. 6 illustrates a user interface display to illustrate operation of the apparatus 100, in accordance with an example of the present disclosure.

Referring to FIGS. 3 and 6, the user interface display 600 of the apparatus 100 may include a display of the event classification 114, for example, at the G-PON wavelength (e.g., 1490 nm) or the XGS-PON wavelength (e.g., 1577 nm) light level. The light power level measurement from block 300 may be utilized to identify the presence of a splitter with either or both wavelengths (e.g., 1490 nm and/or 1577 nm to be above −35 dBm). Yet further, although the examples disclosed herein are described with respect to G-PON wavelength (e.g., 1490 nm) and the XGS-PON wavelength (e.g., 1577 nm), the event identification may also be applied to other types of PON networks and similar technologies.

Figure 7:
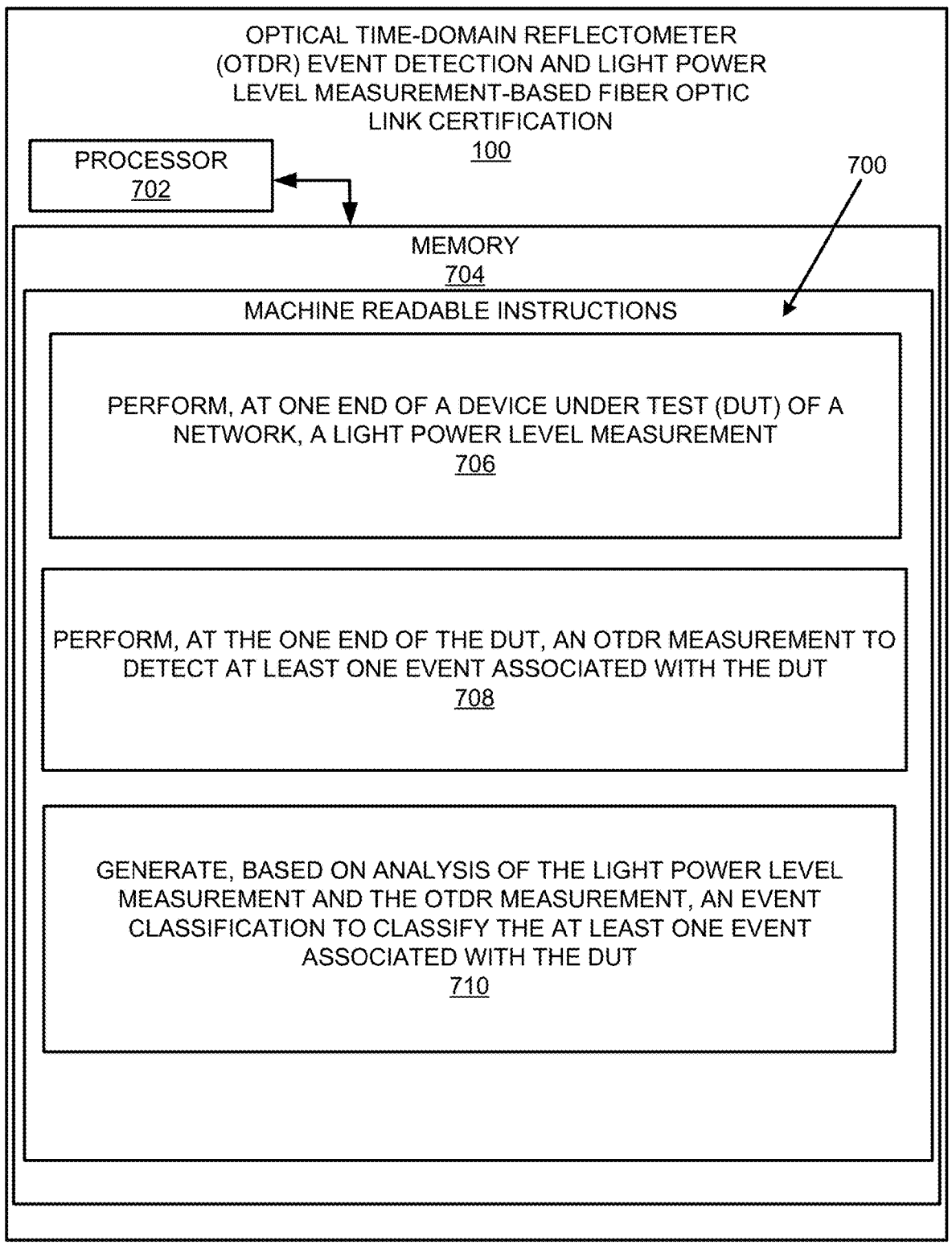
FIG. 7 illustrates an example block diagram for OTDR event detection and light power level measurement-based fiber optic link certification in accordance with an example of the present disclosure.
Figure 9:
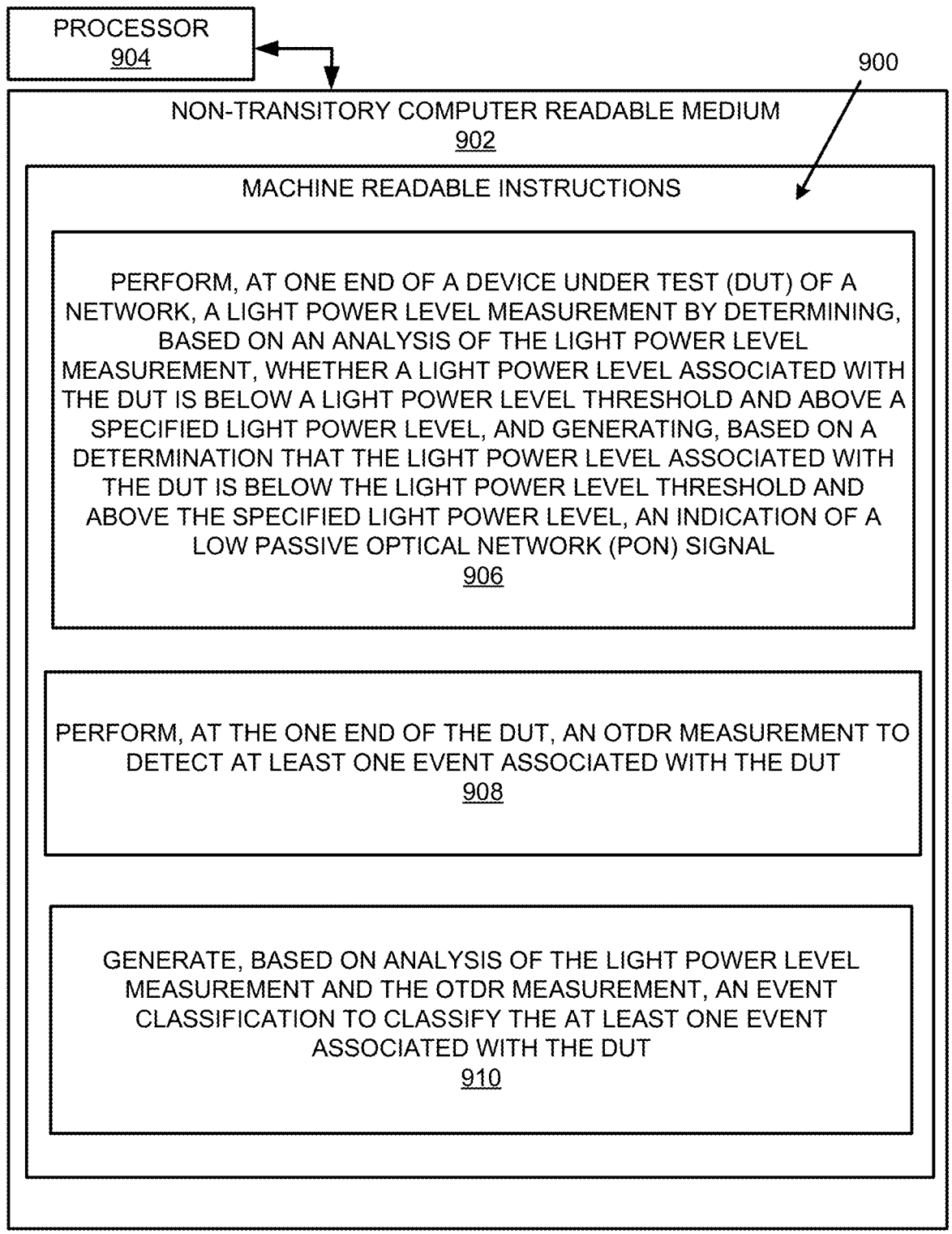
FIG. 9 illustrates a further example block diagram for OTDR event detection and light power level measurement-based fiber optic link certification in accordance with another example of the present disclosure.

FIGS. 7-9 respectively illustrate an example block diagram 700, a flowchart of an example method 800, and a further example block diagram 900 for OTDR event detection and light power level measurement-based fiber optic link certification, according to examples. The block diagram 700, the method 800, and the block diagram 900 may be implemented on the apparatus 100 described above with reference to FIG. 1 by way of example and not of limitation. The block diagram 700, the method 800, and the block diagram 900 may be practiced in other apparatuses. In addition to showing the block diagram 700, FIG. 7 shows hardware of the apparatus 100 that may execute the instructions of the block diagram 700. The hardware may include a processor 702, and a memory 704 storing machine readable instructions that when executed by the processor cause the processor to perform the instructions of the block diagram 700. The memory 704 may represent a non-transitory computer readable medium. FIG. 8 may represent an example method for OTDR event detection and light power level measurement-based fiber optic link certification, and the steps of the method. FIG. 9 may represent a non-transitory computer readable medium 902 having stored thereon machine readable instructions to provide OTDR event detection and light power level measurement-based fiber optic link certification according to an example. The machine readable instructions, when executed, cause a processor 904 to perform the instructions of the block diagram 900 also shown in FIG. 9.

The processor 702 of FIG. 7 and/or the processor 904 of FIG. 9 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to perform, at one end of a device under test (DUT) 104 of a network, a light power level measurement 106.

The processor 702 may fetch, decode, and execute the instructions 708 to perform, at the one end of the DUT 104, an OTDR measurement 110 to detect at least one event associated with the DUT 104.

The processor 702 may fetch, decode, and execute the instructions 710 to generate, based on analysis of the light power level measurement 106 and the OTDR measurement 110, an event classification 114 to classify the at least one event associated with the DUT 104.

Referring to FIGS. 1-6 and 8, and particularly FIG. 8, for the method 800, at block 802, the method may include performing, at one end of a device under test (DUT) 104 of a network, a light power level measurement 106 by determining, by the at least one hardware processor, based on an analysis of the light power level measurement, whether a light power level associated with the DUT is below a specified light power level, and generating, by the at least one hardware processor, based on a determination that the light power level associated with the DUT is below the specified light power level, an indication that there is no light on a passive optical network (PON) wavelength.

At block 804, the method may include performing, at the one end of the DUT 104, an OTDR measurement 110 to detect at least one event associated with the DUT 104.

At block 806, the method may include generate, based on analysis of the light power level measurement 106 and the OTDR measurement 110, an event classification 114 to classify the at least one event associated with the DUT 104.

Referring to FIGS. 1-6 and 9, and particularly FIG. 9, for the block diagram 900, the non-transitory computer readable medium 902 may include instructions 906 to perform, at one end of a device under test (DUT) 104 of a network, a light power level measurement 106 by determining, based on an analysis of the light power level measurement, whether a light power level associated with the DUT is below a light power level threshold and above a specified light power level, and generating, based on a determination that the light power level associated with the DUT is below the light power level threshold and above the specified light power level, an indication of a low passive optical network (PON) signal.

The processor 904 may fetch, decode, and execute the instructions 908 to perform, at the one end of the DUT 104, an OTDR measurement 110 to detect at least one event associated with the DUT 104.

The processor 904 may fetch, decode, and execute the instructions 910 to generating, based on analysis of the light power level measurement 106 and the OTDR measurement 110, an event classification 114 to classify the at least one event associated with the DUT 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a power meter, executed by at least one hardware processor, to perform, at one end of a device under test (DUT) of a network, a light power level measurement;
   an optical time-domain reflectometer (OTDR) event detector, executed by the at least one hardware processor, to perform, at the one end of the DUT, an OTDR measurement at a relatively short pulse width and at a relatively long pulse width to detect at least one event associated with the DUT; and
   an event classifier, executed by the at least one hardware processor, to generate, based on analysis of the light power level measurement and the OTDR measurement at the relatively short pulse width and at the relatively long pulse width, an event classification to classify the at least one event associated with the DUT.

2. The apparatus according to claim 1, wherein the DUT includes a section of a passive optical network (PON) between an optical network terminal (ONT) and a splitter.

3. The apparatus according to claim 1, wherein the power meter further comprises:
   a light power level analyzer, executed by the at least one hardware processor to:
     determine, based on an analysis of the light power level measurement, whether a light power level associated with the DUT is below a specified light power level; and
     generate, based on a determination that the light power level associated with the DUT is below the specified light power level, an indication that there is no light on a passive optical network (PON) wavelength.

4. The apparatus according to claim 1, wherein the OTDR event detector is to perform the OTDR measurement utilizing the relatively short pulse width to detect the at least one event associated with the DUT prior to performing the OTDR measurement utilizing the relatively long pulse width to detect the at least one event associated with the DUT.

5. The apparatus according to claim 3, wherein the event classifier is executed by the at least one hardware processor to generate, based on the analysis of the light power level measurement and the OTDR measurement at the relatively short pulse width and at the relatively long pulse width, the event classification to classify the at least one event associated with the DUT as an inactive optical line terminal (OLT).

6. The apparatus according to claim 1, wherein the event classifier is executed by the at least one hardware processor to generate, based on the analysis of the light power level measurement and the OTDR measurement at the relatively short pulse width and at the relatively long pulse width, the event classification to classify the at least one event associated with the DUT as a splitter.

7. The apparatus according to claim 1, wherein the power meter further comprises:
   a light power level analyzer, executed by the at least one hardware processor to:
     determine, based on an analysis of the light power level measurement, whether a light power level associated with the DUT is above a light power level threshold; and
     generate, based on a determination that the light power level associated with the DUT is above the light power level threshold, an indication of a high passive optical network (PON) signal.

8. The apparatus according to claim 7, wherein the event classifier is executed by the at least one hardware processor to generate, based on the analysis of the light power level measurement and the OTDR measurement at the relatively short pulse width and at the relatively long pulse width, the event classification to classify the at least one event associated with the DUT as a splitter.

9. A method comprising:
   performing, by at least one hardware processor, at one end of a device under test (DUT) of a network, a light power level measurement;
   performing, by the at least one hardware processor, at the one end of the DUT, an optical time-domain reflectometer (OTDR) measurement at a relatively short pulse width and at a relatively long pulse width to detect at least one event associated with the DUT; and
   generating, by the at least one hardware processor, based on analysis of the light power level measurement and the OTDR measurement at the relatively short pulse width and at the relatively long pulse width, an event classification to classify the at least one event associated with the DUT.

10. The method according to claim 9, further comprising:
    determining, by the at least one hardware processor, based on an analysis of the light power level measurement, whether a light power level associated with the DUT is below a specified light power level; and
    based on a determination that the light power level associated with the DUT is below the specified light power level, generating, by the at least one hardware processor, an indication that there is no light on a passive optical network (PON) wavelength.

11. The method according to claim 9, wherein the DUT includes a section of a passive optical network (PON) between an optical network terminal (ONT) and a splitter.

12. The method of claim 9, wherein performing the OTDR measurement at the relatively short pulse width and at the relatively long pulse width to detect the at least one event associated with the DUT comprises:
    performing, by the at least one hardware processor, the OTDR measurement utilizing the relatively short pulse width to detect the at least one event associated with the DUT prior to performing, by the at least one hardware processor, the OTDR measurement utilizing the relatively long pulse width to detect the at least one event associated with the DUT.

13. A non-transitory computer readable medium having stored thereon machine readable instructions that, when executed by at least one hardware processor, cause the at least one hardware processor to:
perform, at one end of a device under test (DUT) of a network, a light power level measurement;
perform, at the one end of the DUT, an OTDR measurement at a relatively short pulse width and at a relatively long pulse width to detect at least one event associated with the DUT; and
generate, based on analysis of the light power level measurement and the OTDR measurement at the relatively short pulse width and at the relatively long pulse width, an event classification to classify the at least one event associated with the DUT.

14. The non-transitory computer readable medium according to claim 13, wherein the machine readable instructions to generate, based on the analysis of the light power level measurement and the OTDR measurement at the relatively short pulse width and at the relatively long pulse width, the event classification to classify the at least one event associated with the DUT as a splitter.

15. The non-transitory computer readable medium according to claim 13, wherein the DUT includes a section of a passive optical network (PON) between an optical network terminal (ONT) and a splitter.

16. The non-transitory computer readable medium according to claim 13, wherein, to perform the OTDR measurement at the relatively short pulse width and at the relatively long pulse width to detect the at least one event associated with the DUT, the machine readable instructions cause the at least one hardware processor to:
perform the OTDR measurement utilizing the relatively short pulse width to detect the at least one event associated with the DUT prior to performing the OTDR measurement utilizing the relatively long pulse width to detect the at least one event associated with the DUT.

* * * * *